(12) United States Patent
Chen et al.

(10) Patent No.: US 7,983,176 B2
(45) Date of Patent: Jul. 19, 2011

(54) METHOD AND SYSTEM FOR MONITORING COMMUNICATIONS OF AN INDIVIDUAL IN A PACKET NETWORK

(75) Inventors: Zesen Chen, Pleasanton, CA (US); Peter Chou, San Ramon, CA (US); Sean Chen, Sunnyvale, CA (US); Yongdong Zhao, Pleasanton, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1699 days.

(21) Appl. No.: 11/228,134

(22) Filed: Sep. 16, 2005

(65) Prior Publication Data

US 2007/0064678 A1   Mar. 22, 2007

(51) Int. Cl.
*H04J 3/14* (2006.01)

(52) U.S. Cl. ........ 370/247; 370/244; 370/250; 370/393; 370/395.1

(58) Field of Classification Search .................. 370/352, 370/395.65, 351, 224, 252, 393, 244, 250, 370/395.1, 247; 379/219, 35, 220, 88.19
See application file for complete search history.

(56) References Cited

U.S. PATENT DOCUMENTS

| | | | | |
|---|---|---|---|---|
| 6,078,648 | A * | 6/2000 | Albers et al. ..................... | 379/35 |
| 6,496,483 | B1 * | 12/2002 | Kung et al. ..................... | 370/252 |
| 7,055,174 | B1 * | 5/2006 | Cope et al. ....................... | 726/22 |
| 7,106,741 | B2 * | 9/2006 | Dianda ........................... | 370/393 |
| 7,388,947 | B2 * | 6/2008 | Smith et al. ..................... | 379/35 |
| 7,460,484 | B2 * | 12/2008 | Roberts et al. ................. | 370/244 |
| 7,889,744 | B2 * | 2/2011 | Chen et al. .................. | 370/395.1 |
| 2002/0085499 | A1 | 7/2002 | Toyoyama et al. | |
| 2003/0078041 | A1 * | 4/2003 | Dikmen et al. ............... | 455/433 |
| 2003/0147397 | A1 * | 8/2003 | Dianda ....................... | 370/395.2 |
| 2003/0215069 | A1 * | 11/2003 | Hitzeman ................... | 379/88.19 |
| 2004/0179513 | A1 * | 9/2004 | Smith et al. ..................... | 370/352 |
| 2004/0233983 | A1 * | 11/2004 | Crawford et al. ......... | 375/240.01 |
| 2004/0255126 | A1 * | 12/2004 | Reith ............................ | 713/183 |
| 2005/0094773 | A1 * | 5/2005 | Peterson ........................ | 379/35 |
| 2006/0053010 | A1 * | 3/2006 | Chapman et al. ............. | 704/235 |

* cited by examiner

*Primary Examiner* — Ricky Ngo
*Assistant Examiner* — Dewanda Samuel
(74) *Attorney, Agent, or Firm* — Hope Baldauff Hartman, LLC

(57) ABSTRACT

A system and method are disclosed for monitoring communications of an individual in a packet network. A system that incorporates teachings of the present disclosure may include, for example, a network monitor having a communications interface coupled to a packet network, and a controller. The controller can be programmed to receive a request from a third party to monitor communications associated with an individual, convey to the third party information monitored on a group of one or more permanent virtual circuits (PVCs) of the packet network associated with the individual, detect an update in the group of one or more PVCs, determine new set of one or more PVCs associated with the individual, and convey to the third party information monitored from the new set of one or more PVCs.

17 Claims, 3 Drawing Sheets

US 7,983,176 B2

METHOD AND SYSTEM FOR MONITORING COMMUNICATIONS OF AN INDIVIDUAL IN A PACKET NETWORK

FIELD OF THE DISCLOSURE

The present disclosure relates generally to monitoring systems, and more specifically to a method and system for monitoring communications of an individual in a packet network.

BACKGROUND

The Communications Assistance for Law Enforcement Act sets forth rules by which telecommunications providers can be asked to assist law enforcement agencies in surveillance activities. The autonomous routing nature of packet networks can at anytime interrupt a wiretap established on a specific individual.

A need therefore arises for a method and system for monitoring communications of an individual in a packet network.

DETAILED DESCRIPTION OF THE DRAWINGS

Figure 1:
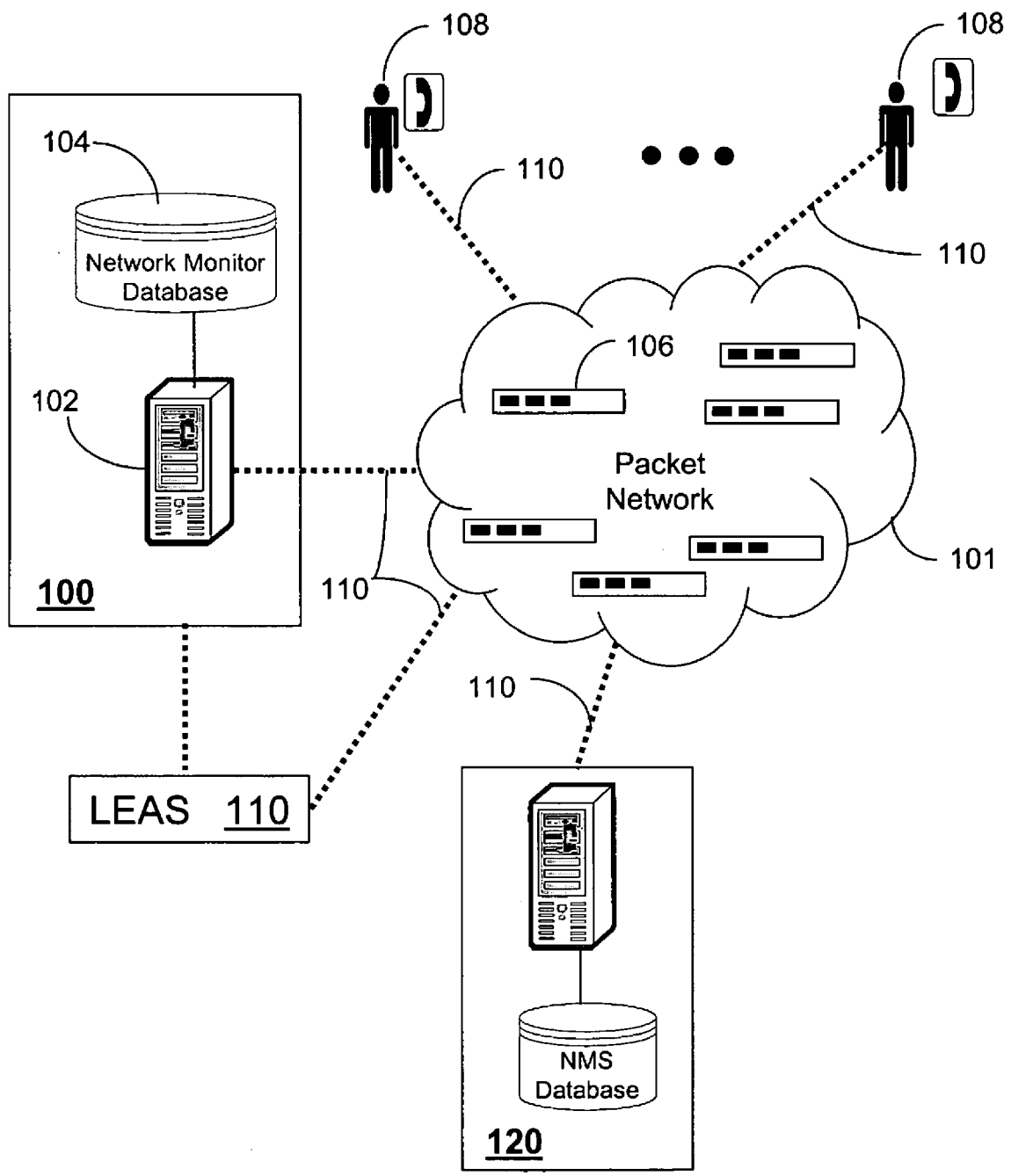
FIG. 1 is a block diagram of a network monitor incorporating teachings of the present disclosure.

FIG. 1 is a block diagram of a network monitor 100 coupled to a packet network 101 incorporating teachings of the present disclosure. The network monitor 100 comprises a communications interface 110, a memory 104 and a controller 102. The communications interface 110 utilizes wired or wireless communications technology for interfacing to the packet network 101.

The packet network 101 includes network elements 106 which can be embodied as switches and/or routers. Switches can be represented as an Asynchronous Transfer Mode (ATM) switches, while routers can be represented by frame relay routers, Multi-Protocol Label Switching (MPLS) routers, or combinations thereof. The packet network 101 can provide Internet services to customers 108 such as data, voice, and/or video. With broadband communication services, customers 108 of the packet network 101 can intercommunicate with each other utilizing, for example, VoIP (Voice over Internet communications, and/or receive entertainment and network media by way of IPTV (Internet Protocol Television). The packet network 101 can also interface with cellular telephony, and other known and communication networks to provide its customers expansive communications services.

The controller 102 can utilize common computing technology such as a desktop computer, or a scalable server. The memory 104 comprises mass storage media such as a high capacity disk drive that can be used by the controller 102 for managing one or more databases in accordance with the present disclosure. The network monitor 100 can also use applications such as a CRM (Customer Relations Management) for managing customer account information.

By way of the communications interface 110, the network monitor 100 can access independently operated remote systems such as a network management system (NMS) 120 that can monitor and manage the network elements 106 of the packet network 101. The network monitor 100 can also interface to a Law Enforcement Agency System (LEAS) 110 managed by a law enforcement agency such as the FBI, NSA, CIA, and so on. The LEAS 110 can utilize a computing system capable of monitoring communications between individuals 108 in the packet network 101. Alternatively, the LEAS 110 can be directly linked to the network monitor 100 to prevent tampering with the interface between the network monitor 100 and the LEAS 110. It will be appreciated that the LEAS 110 and NMS 120 can be in whole or in part an integral part of the network monitor 100.

Figure 2:
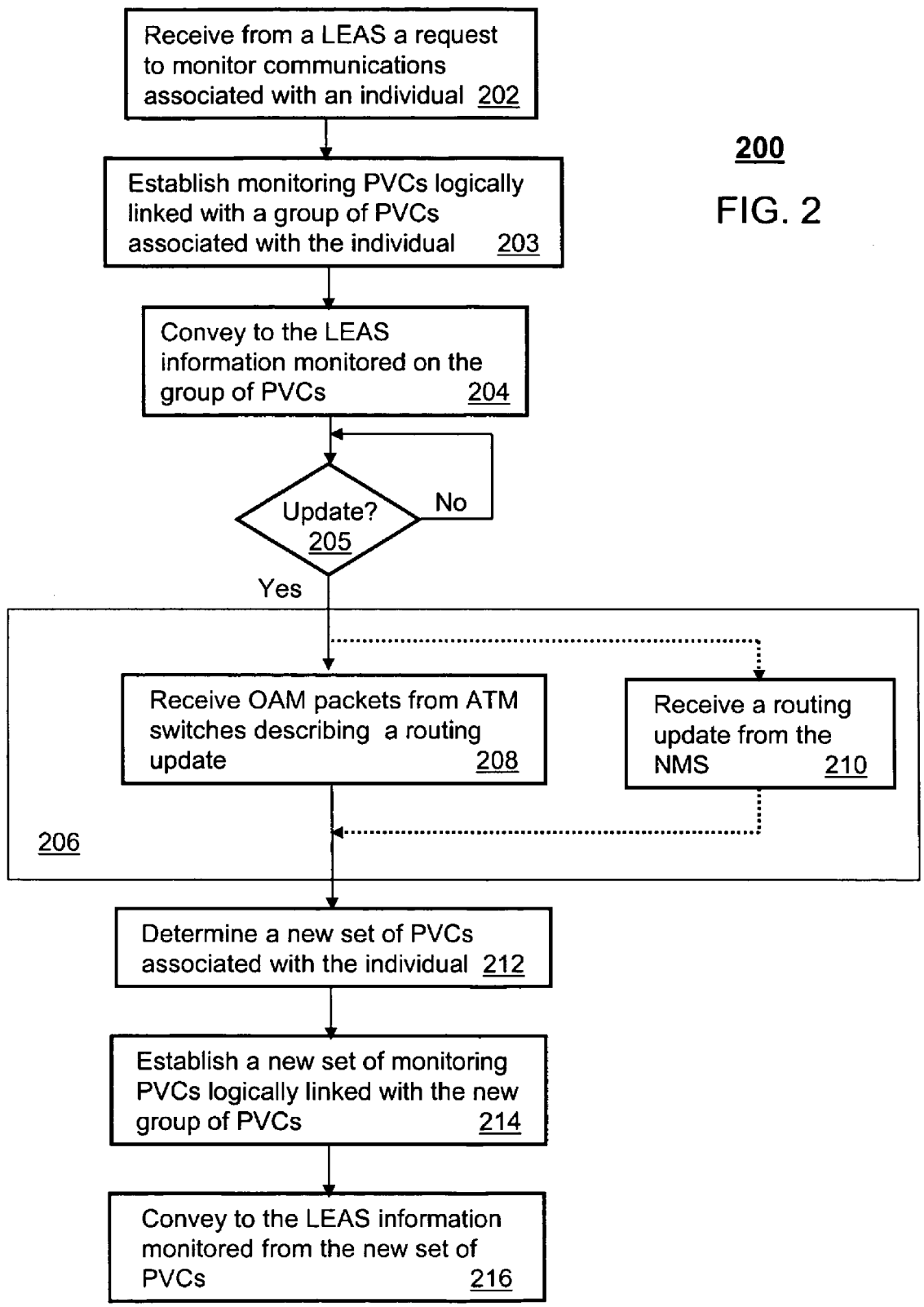
FIG. 2 depicts a flowchart of a method operating in the network monitor according to teachings of the present disclosure.

FIG. 2 depicts a flowchart of a method 200 operating in the network monitor 100 incorporating teachings of the present disclosure. Method 200 begins with step 202 where the controller 102 is programmed in step 202 to receive from a LEAS 110 a request to monitor communications associated with a terminal device of an individual 108. The terminal device can be an immobile or mobile communication device such as a desktop computer, VoIP phone, cell phone, or other communications means. The term communications in the present context can mean any form of communications such as, for example, data file transfers, coded messages, audio (such as VoIP), and/or audio-visual communications. In response to step 202, the controller 102 establishes in step 203 with the network elements 106 one or more monitoring permanent virtual circuits (PVCs) logically linked to a group of one or more PVCs used by said individual 108 for communications purposes. In the present context, monitoring PVCs can mean PVCs that map (or tap) into one or more segment of PVCs used by the individual for end-to-end communications. These monitoring PVCs can be established in step 203 by way of direct communications between the network monitor 100 and the network elements 106, or by way of indirect communications provided by the NMS 120. In step 204, the network monitor 100 conveys to the LEAS 110 information monitored on the group of PVCs. The monitored information can include data, voice and/or video communications originated or received by the individual.

Typically, in packet networks such as shown in FIG. 1, PVCs can dynamically change in response to a network event such as a fault in one or more network elements 106 (e.g., a downed router, or switch), or a modification or addition of network elements 106 to the packet network 101. During end-to-end communications the speed at which a routing update takes place can be imperceptible to the parties 108 communicating. To the LEAS 110, however, a change in the group of PVCs can prevent further monitoring. To mitigate this interruption, the network monitor 100 can be programmed to detect the change in step 205 according to any one of two embodiments in step 206.

In a first embodiment, network elements 106 embodied, for example, as ATM switches, can be programmed in step 208 to submit packets to the network monitor 100 describing the change to the group of PVCs. Said change can be, for example, a simple notice indicating that the PVC mapping of individual has changed, or a more complete notice describing the new mapping of the PVCs associated with the individual being monitored. In the latter case, the new mapping can be originated by the NMS 120 (having an overall network view of routing updates) which conveys the information to one or more of the network elements 106 for redirection to the network monitor 100. The routing update can be carried in packets that can conform to, for example, an Operations Administration and Maintenance (OAM) protocol.

Alternatively, the network monitor 100 can receive a routing update from the NMS 120. The NMS 120 represents a common system utilized by a telecommunications provider for configuring, monitoring and managing the network elements 106 of the packet network 101. The NMS 120 has full view of network activities including but not limited to routing updates. Thus when an autonomous PVC routing update occurs in response to any of the aforementioned events, the NMS 120 can recognize the event, gather telemetry information (such as a routing update) from the network elements 106, and thereby inform the network monitor 100 of the new group of PVCs resulting from the routing update. Communications from the NMS 120 to the network monitor 100 can be by way of a logical IP link of the packet network 101, indirectly by relaying communication through one or more network elements 106, or by both direct and indirect means in order provide redundancy in communications with the network monitor 100.

From either of these embodiments, the network monitor 100 can in step 212 determine a new set of PVCs associated with the individual, and in step 214 establish a new set of PVCs logically linked thereto. As a consequence of step 214, the network monitor 100 in step 216 can continue to convey to the LEAS 110 information monitored in relation to the individual on the basis of the new set of PVCs.

Figure 3:
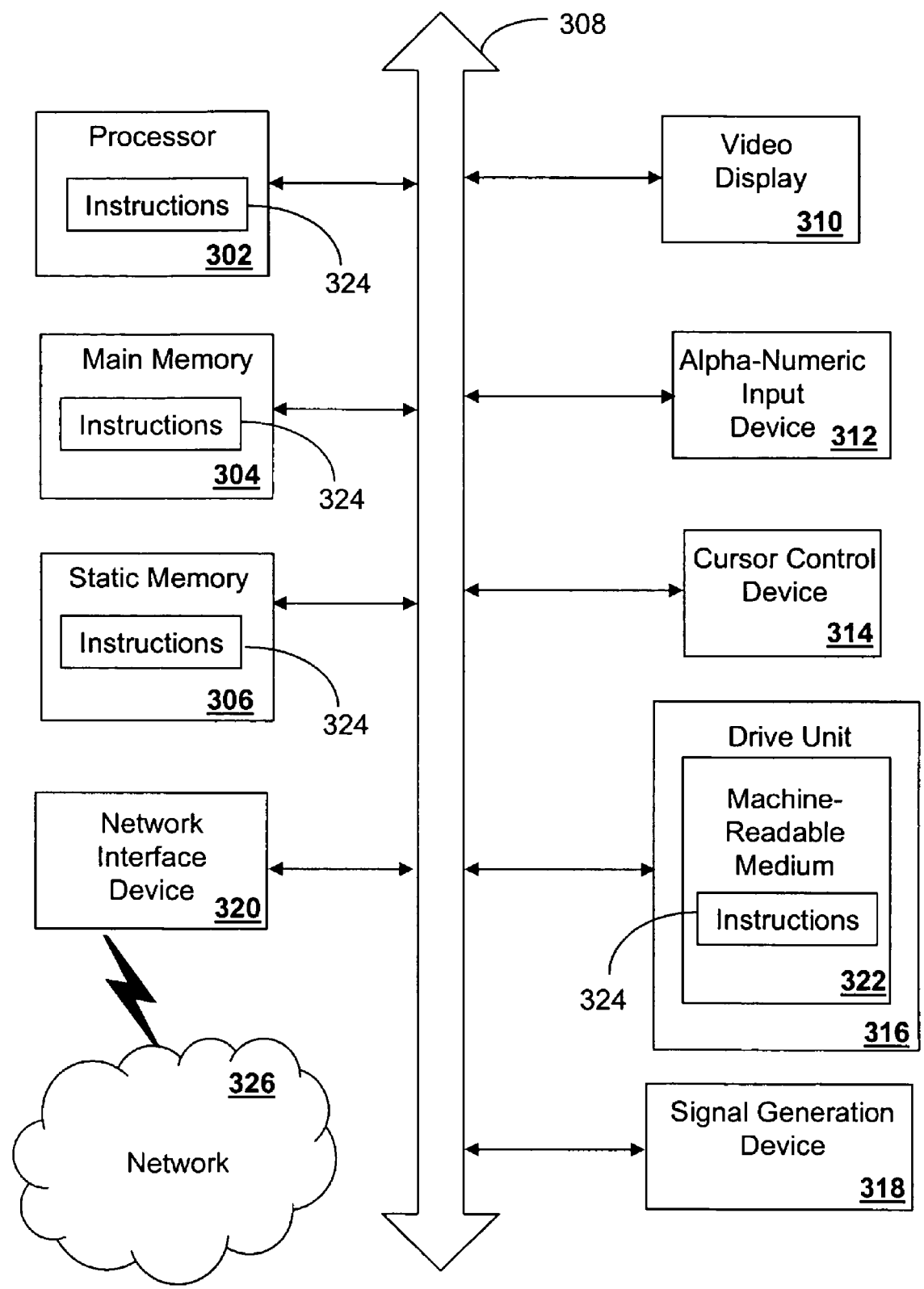
FIG. 3 is a diagrammatic representation of a machine in the form of a computer system within which a set of instructions, when executed, may cause the machine to perform any one or more of the methodologies discussed herein.

FIG. 3 is a diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated above. The instructions 324 may also reside, completely or at least partially, within the main memory 304, the static memory 306, and/or within the processor 302 during execution thereof by the computer system 300. The main memory 304 and the processor 302 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A network monitor, comprising:
  a communications interface coupled to a packet network; and
  a controller programmed to:
    receive a request from a third party to monitor communications associated with an individual,
    convey to the third party first information monitored on a group of permanent virtual circuits of the packet network associated with the individual,
    detect an update in the group of permanent virtual circuits,
    determine a new group of permanent virtual circuits associated with the individual,
    establish a new set of monitoring permanent virtual circuits logically linked to the new group of permanent virtual circuits, and
    convey to the third party second information monitored from the new group of permanent virtual circuits.

2. The network monitor of claim 1, wherein the controller is programmed to receive a packet from a corresponding network element of the packet network indicative of the update to the group of permanent virtual circuits.

3. The network monitor of claim 2, wherein the packet conforms to an operations administration and maintenance packet protocol, and wherein the corresponding network element comprises an asynchronous transfer mode switch.

4. The network monitor of claim 1, wherein the controller is programmed to establish a set of monitoring permanent virtual circuits logically linked to the group of permanent virtual circuits associated with the individual.

5. The network monitor of claim 2, wherein the corresponding network element comprises any one among a plurality of switches and routers, and wherein each switch of the plurality of switches and routers comprises an asynchronous transfer mode switch, and each router of the plurality of switches and routers comprises at least one among a frame relay router and a multi-protocol label switching router.

6. The network monitor of claim 1, wherein the controller is programmed to receive a message from a network management system coupled to the packet network describing the update to the group of permanent virtual circuits.

7. The network monitor of claim 1, wherein the controller is programmed to receive the update by at least one among a group of sources comprising network elements, a network management system, and the network elements relaying the update from the network management system.

8. The network monitor of claim 1, wherein the controller is programmed to monitor the first communications associated with a terminal device of the individual.

9. A non-transitory computer-readable storage medium, comprising computer instructions for:
  receiving from a third party a request to monitor communications associated with an individual;
  conveying to the third party first information of the individual as monitored on a group of permanent virtual circuits of a packet network associated with the individual;
  detecting a routing update in the group of permanent virtual circuits;
  determining a new group of permanent virtual circuits associated with the individual;
  establishing a new set of monitoring permanent virtual circuits logically linked to the new group of permanent virtual circuits; and
  conveying to the third party second information monitored from the new group of permanent virtual circuits.

10. The non-transitory computer-readable storage medium of claim 9, comprising computer instructions for receiving a packet from a corresponding network element of the packet network describing the routing update in the group of permanent virtual circuits.

11. The non-transitory computer-readable storage medium of claim 10, wherein the packet conforms to an operations administration and maintenance packet protocol, and wherein the computer-readable storage medium comprises computer instructions for decoding the operations administration and maintenance packet protocol.

12. The non-transitory computer-readable storage medium of claim 11, wherein the corresponding network element comprises an asynchronous transfer mode switch.

13. The non-transitory computer-readable storage medium of claim 9, comprising computer instructions for receiving a message from a network management system coupled to the packet network describing the routing update.

14. The non-transitory computer-readable storage medium of claim 10, wherein the corresponding network element comprises any one among a plurality of switches and routers, and wherein each switch of the plurality of switches and routers comprises an asynchronous transfer mode switch, and each router of the plurality of switches and routers comprises at least one among a frame relay router and a multi-protocol label switching router.

15. The non-transitory computer-readable storage medium of claim 9, comprising computer instructions for receiving the request from a law enforcement agency system to monitor the communications associated with a terminal device of the individual, wherein the terminal device comprises at least one among an immobile communication device and a mobile communication device.

16. A method, comprising:

receiving a request from a law enforcement agency system to monitor communications associated with an individual;

conveying first information of the individual to the law enforcement agency system as monitored on a group of permanent virtual circuits of a packet network associated with the individual;

receiving a routing update in the group of permanent virtual circuits;

determining a new group of permanent virtual circuits associated with the individual;

establishing a new set of monitoring permanent virtual circuits logically linked to the new group of permanent virtual circuits; and conveying second information monitored from the new group of permanent virtual circuits to the law enforcement agency system.

17. The method of claim 16, wherein the routing update comprises operations administration and maintenance packets, and wherein the routing update is received from a group of sources comprising network elements of the packet network, a network management system coupled to the packet network, and the network elements relaying the update from the network management system.

\* \* \* \* \*